T. E. MURRAY.
METHOD OF FLANGING THE END OF A METAL TUBE.
APPLICATION FILED NOV. 29, 1916.

1,215,965.

Patented Feb. 13, 1917.

INVENTOR
Thomas E. Murray
BY Paul Benjamin
his ATTORNEY

UNITED STATES PATENT OFFICE.

THOMAS E. MURRAY, OF NEW YORK, N. Y.

METHOD OF FLANGING THE END OF A METAL TUBE.

1,215,965.  Specification of Letters Patent.  Patented Feb. 13, 1917.

Application filed November 29, 1916. Serial No. 134,002.

*To all whom it may concern:*

Be it known that I, THOMAS E. MURRAY, a citizen of the United States, residing at New York, in the county of New York and State of New York, have invented a certain new and useful Improvement in Methods of Flanging the End of a Metal Tube, of which the following is a specification.

The invention is a method of forming a flange at the end of a metal tube, the said method consisting in the several steps performed in the order pointed out in the claims.

In the accompanying drawings—

Figure 1:
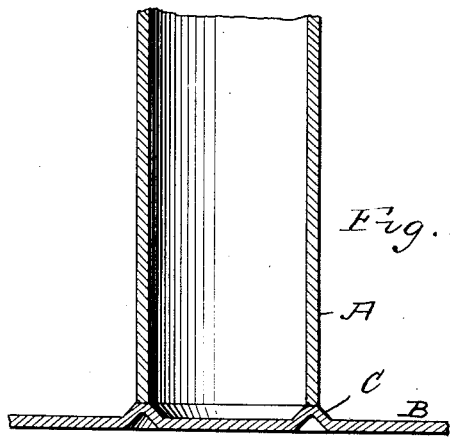
Figure 2:
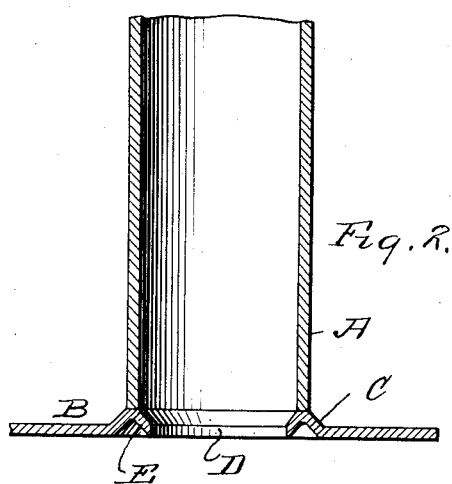
Figure 3:
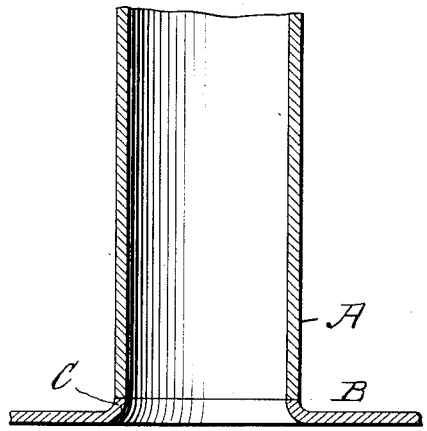
Figure 4:
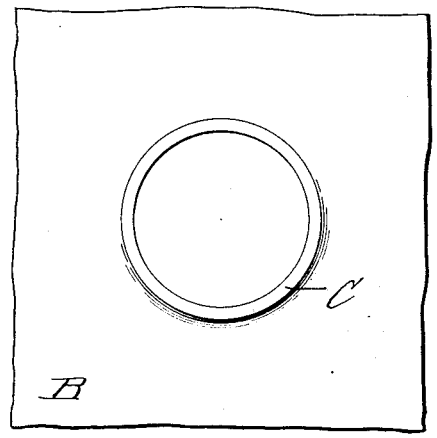

Figure 1 is a longitudinal section of a tube and the plate from which the flange is to be formed. Fig. 2 is a similar section of the tube and plate, after the plate and tube have been welded together and the opening D cut through the plate. Fig. 3 is a similar section of the tube with the completed flange. Fig. 4 is a plan view of the plate, showing the circular welding rib thereon.

Similar letters of reference indicate like parts.

A is the tube, and B is a plate of metal from which the flange is to be made. I form upon the surface of the plate a rib C integral therewith and of the same diameter as the tube. I place the end of the tube upon the rib, as shown in Fig. 1, and cause a welding current to pass through the joint between said tube end and said rib, whereby said tube end and said rib are welded together. I then form a circular opening D in the plate, by boring or cutting, as shown in Fig. 2. Preferably I make this opening somewhat smaller in diameter than the bore of the tube, and afterward remove the projecting circular edge E to bring the tube and flange formed by the projecting portion of said plate, substantially the same bore diameter at the joint, as shown in Fig. 3.

I claim:

1. The method of flanging the end of a tube, which consists in, first, integrally forming on the surface of a flat metal plate, a circular rib of like diameter to the tube; second, placing the butt end of said tube in contact with said rib and electrically welding together said tube and said rib, and, third, making a circular opening in the portion of said plate surrounded by said tube wall.

2. The method of flanging the end of a tube, which consists in, first, integrally forming on the surface of a flat metal plate, a circular rib of like diameter to the tube; second, placing the butt end of said tube in contact with said rib and electrically welding together said tube and said rib; third, making a circular opening in the portion of said plate surrounded by said tube wall, the said opening being of less diameter than the diameter of said tube, and, fourth, removing the circumferential edge of said opening and thereby increasing the diameter of said opening substantially to equal the diameter of the bore of said tube.

In testimony whereof I have affixed my signature in presence of two witnesses.

THOMAS E. MURRAY.

Witnesses:
GERTRUDE T. PORTER,
MAY T. McGARRY.